April 21, 1925. 1,534,658
H. E. PEARSON
MACHINE FOR REMOVING QUACK GRASS
Filed April 16, 1923 3 Sheets-Sheet 1

INVENTOR
HERMAN E. PEARSON
BY
Paul, Paul + Moore
ATTORNEYS

April 21, 1925.

H. E. PEARSON 1,534,658

MACHINE FOR REMOVING QUACK GRASS

Filed April 16, 1923    3 Sheets-Sheet 2

FIG. 2

INVENTOR
HERMAN E. PEARSON
BY
Paul, Paul & Moore
ATTORNEYS

April 21, 1925.  1,534,658
H. E. PEARSON
MACHINE FOR REMOVING QUACK GRASS
Filed April 16, 1923   3 Sheets-Sheet 3

INVENTOR
HERMAN E. PEARSON
ATTORNEYS

Patented Apr. 21, 1925.

1,534,658

UNITED STATES PATENT OFFICE.

HERMAN E. PEARSON, OF WAYZATA, MINNESOTA.

MACHINE FOR REMOVING QUACK GRASS.

Application filed April 16, 1923. Serial No. 632,431.

*To all whom it may concern:*

Be it known that I, HERMAN E. PEARSON, a citizen of the United States, residing at Wayzata, county of Hennepin, and State of Minnesota, have invented certain new and useful Improvements in Machines for Removing Quack Grass, of which the following is a specification.

The object of my invention is to provide a machine for gathering up quack grass from loose soil as it is turned over, and the grass roots released in the operation of the plow.

A further object is to provide a machine of this type that is adapted for adjustment to vary the angle and elevation of the grass picking reels with respect to the surface of the furrow.

Other objects of the invention will appear from the following detailed description.

The invention consists generally in various constructions and combinations all as hereinafter described and particularly pointed out in the claims.

In the accompanying drawings forming part of this specification,

Figure 2 is a plan view of the same;

In the drawing:

Figure 1:
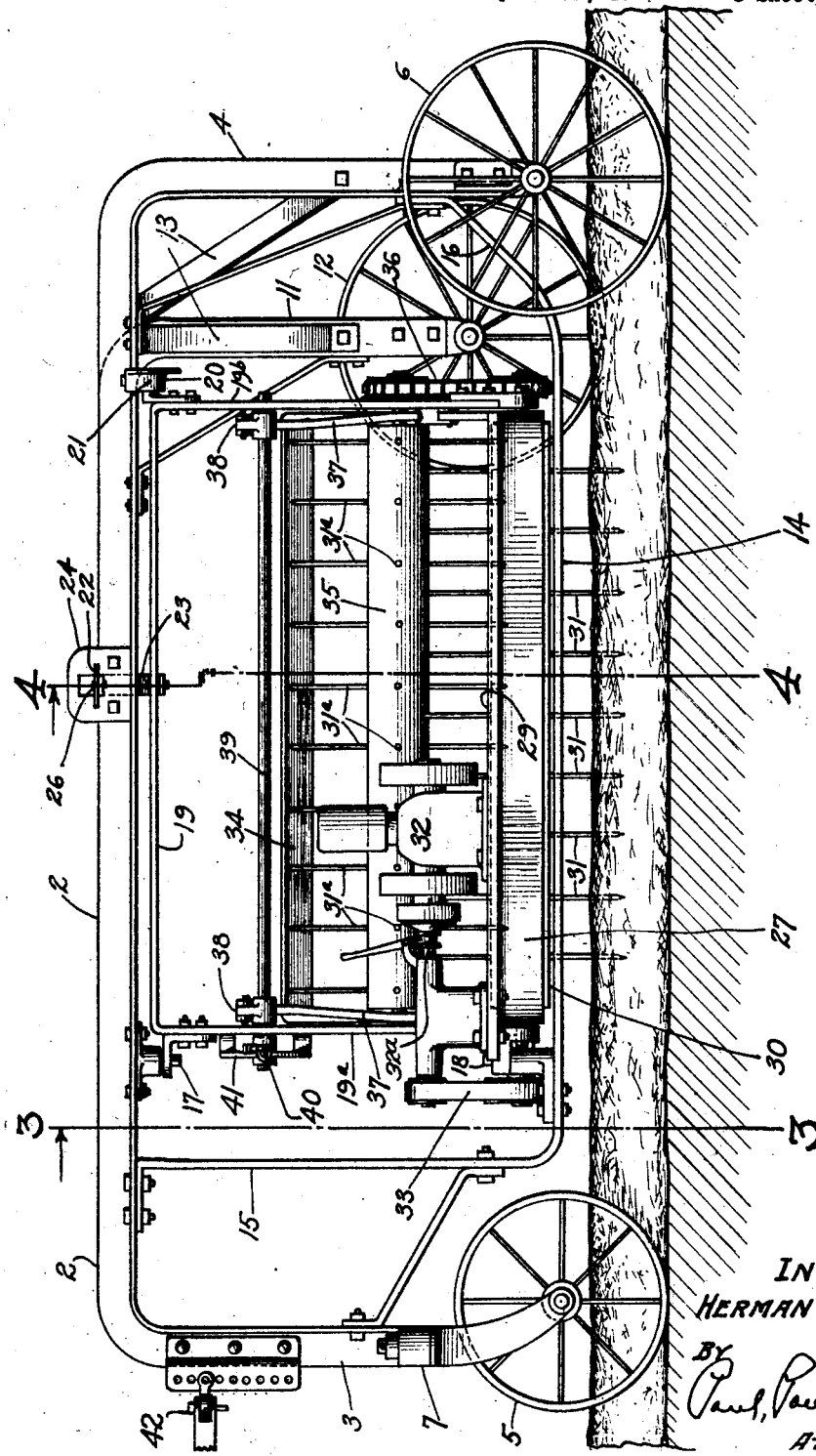
Figure 1 is a side elevation of a quack grass removing machine embodying my invention.

2 represents a rail, preferably of angle bar, having depending ends 3 and 4 whereon carrying wheels 5 and 6 are mounted, the former being swiveled at 7 for oscillation in guiding the machine. These wheels are in alignment or adapted to track in the furrow, as shown in Figure 1.

A rail 8 is secured at its forward portion to the corresponding end of the rail 2 and extends backwardly and diagonally therefrom and has a rear portion 9 that is substantially parallel with the rail 2 and is connected with the rear portion thereof by a cross-brace 10. A depending end 11 for the part 9 is provided whereon a wheel 12 is mounted and adapted to run upon the land, and is preferably of wider tread than the wheels that are in the furrow. Suitable braces 13 connect the depending portions of the rails at the rear with the cross-brace 10. A lower rail 14 has an upwardly turned end 15 that is secured to the rail 2 at the forward end of the machine, and a rear upwardly turned portion 16 that is secured to the depending portion 4 at the rear of the machine. Depending from the rail 2, I provide a pivot pin 17 and a similar pivot pin 18 is mounted on the rail 14 beneath and opposite the pin 17. A reel frame 19 is mounted on these pivot pins and adapted to swing in a horizontal plane transversely to the direction of movement of the machine. The pivots support the reel frame at one end, and at the other, I provide a track 20 secured to the rails 2 and 8 and upon the reel frame I provide an anti-friction wheel 21 that is adapted to roll on the track 20 to allow adjustment of the reel frame and at the same time maintain its horizontal position as it is swung back and forth across the furrow.

Figures 4, 5:
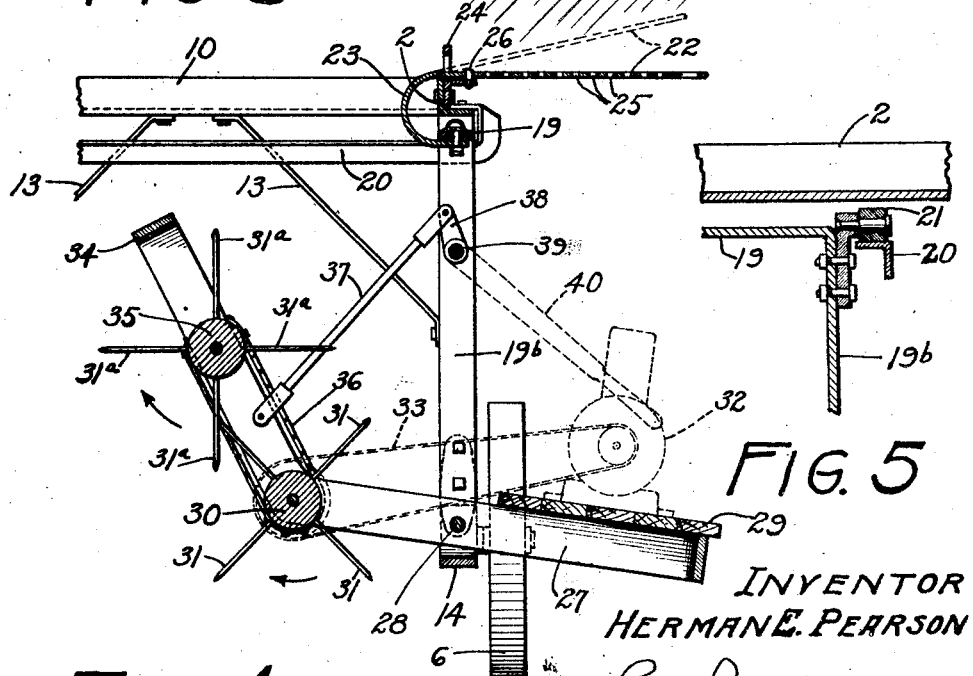
Figure 4 is a sectional view on the line 4—4 of Figure 1.
Figure 5 is a detailed sectional view showing the means provided for carrying the outer end of the supporting frame upon which the grass lifting reels are mounted.

A lever 22 has a curved end 23 mounted on the reel frame 19, and on the rail 2, a guide 24 is provided in which said lever is adapted to slide, and said lever has a series of holes 25 therein adapted to receive a pin 26 for locking the lever in its adjusted positions; the middle of the lever having sufficient spring to allow it to be raised and disengaged from the pin as indicated by dotted lines in Figure 4. When so disengaged, the operator can apply pressure to the lever and swing the reel frame horizontally back and forth across the furrow.

The frame 19, which I have designated as a reel frame, comprises a horizontal upper portion and depending end portions whereon the pivots of the frame are mounted and I will designate these depending end portions by reference numerals 19[a] and 19[b]. A yoke 27 is centrally pivoted at 28 to the lower portions of the depending arms 19[a] and 19[b]; said yoke being substantially U-shaped and having a platform 29 on one side of its pivot and a roller 30 mounted in its parallel arms upon the opposite side of its pivot and provided with a series of grass picking fingers 31 which with the roller constitute one of the quack grass removing reels.

Figure 3:
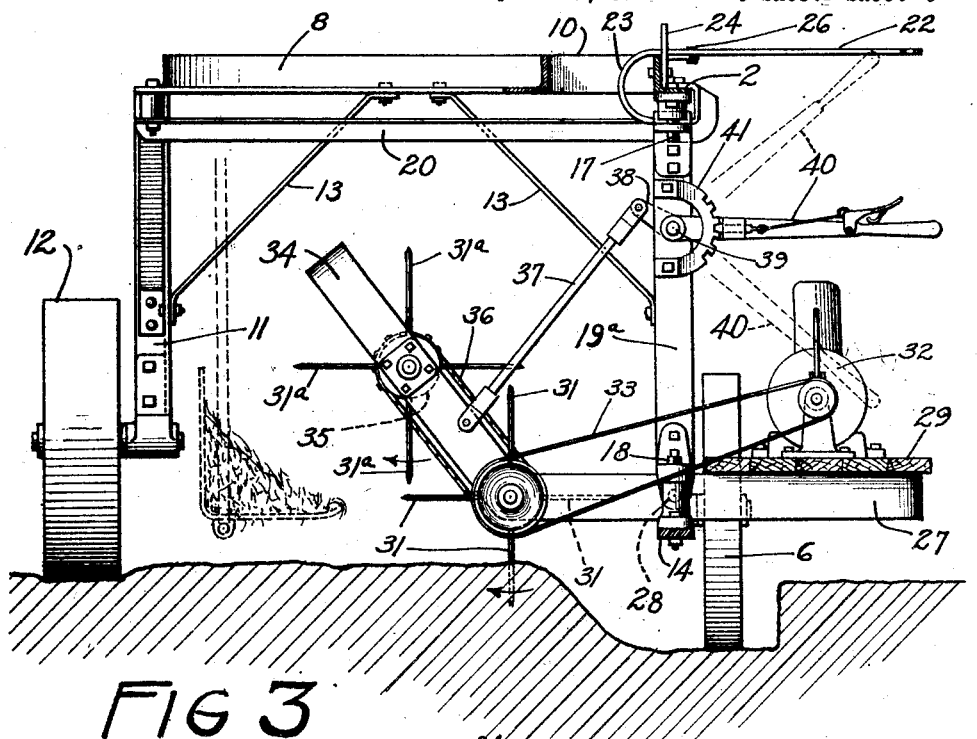
Figure 3 is a sectional view on the line 3—3 of Figure 1.

A source of motive power such as a gas engine 32, preferably having a clutch 32[a] is mounted on the platform 29 to tilt wit the yoke 27 and swing with the reel frame, and a suitable driving means such as a belt 33 connects the engine 32 with the roller 30 through the clutch 32ª. A yoke 34 has its arms secured to the arms of the yoke 27, (here shown as integral therewith) and carries a roller 35 having fingers 31ª corresponding to those described and positioned to cooperate with the fingers 31 for gathering up the quack grass from soil. A belt or chain 36 drives the roll 35 from the roll 30 and insures continuous simultaneous operation thereof. Rods 37 connect the yoke 34 with crank-arms 38 on a shaft 39 that is mounted in bearings in the reel frame. An operating lever 40 is mounted on said shaft and is movable over a quadrant 41. By means of this lever and its locking latch, the yoke 34 and with it the frame 27, may be tilted on the pivots 28 to raise or lower the revolving reels and adjust them the desired distance from the soil. In Figure 3, the frame 27 is shown in a horizontal position with the lower reel in position to dig its fingers into the soft soil thrown up by the plow for the purpose of gathering up the quack grass and separating it from the loose soil. The other reel is positioned so that its fingers operate between those of the first reel and the movement of the fingers of these reels is so timed that those of the upper reel will operate to strip the grass and roots from the fingers of the lower reel, depositing them in a windrow at one side of the furrow, or in a suitable receptacle for the purpose that may be suspended from the frame as indicated by dotted lines in Figures 2 and 3.

As shown in Figures 3 and 4, the reels are on one side of the pivot of the yoke or frame 27 and the source of motive power is on the other side of the pivot, one forming a substantial balance for the other, so that the operator will find it comparatively easy to move the lever 40 and tilt the revolving reels to their desired angle and position with respect to the ground line. Generally, in the operation of the machine, the horizontally swinging frame will be adjusted to the desired angle when the supporting wheels enter the furrow and will be left in this position, the proper angle having been determined by experiment to produce the best result in the quack grass gathering operation. During the movement of the machine, however, the operator may tilt the yokes or frames directly supporting the reels, changing their elevation as the depth of the furrow may vary or as the gathering operation may render advisable. For instance, if the operator finds that the fingers of the lower reel are not entering the ground far enough, he may depress the reel causing the fingers to dig deeper. On the other hand, if the fingers are entering the soil too far, then the supporting frame may be tilted upwardly, raising the reels until the desired elevation is obtained.

I have shown a draft attachment 42 at the forward end of the machine by means of which the apparatus may be connected with a suitable plow; it being my intention to have the machine follow directly after the plow and gather up the quack grass that is thrown up with the furrow, immediately after the furrow is made, and before the soil has packed or settled. I am thus able to effectually clear the soil of quack grass and roots thereof and gradually eliminate this objectionable grass from the land.

I claim as my invention:

1. A machine of the class described comprising a frame having forward and rear wheels to travel in the furrow, and a wheel to run on the land, a frame mounted to swing horizontally and diagonally with respect to said machine frame, and a revolving reel supported in said swinging frame and having pins therein to dig into the loose soil thrown up by the plow and collect the grass roots therein.

2. A machine of the class described comprising a frame having forward and rear wheels to travel in the furrow, and a wheel to run on the land, a frame mounted to swing horizontally and diagonally with respect to said machine frame, a reel supported in said swinging frame and having pins therein to dig into the loose soil thrown up by the plow and collect the grass roots therein, said reel being mounted to tilt vertically to raise and lower its grass picking fingers.

3. A machine of the class described comprising a frame having forward and rear wheels to travel in the furrow, and a side wheel to run on the land, a swinging frame mounted in said machine frame, a reel carried thereby and having fingers to dig into the loose soil thrown up by the plow, a source of motive power carried by said swinging frame for operating said reel, and means for adjusting said swinging frame on its pivots to vary the horizontal position of said reel with respect to the soil.

4. A machine of the class described comprising a frame having carrying wheels, a swinging frame mounted therein to oscillate on vertical pivots diagonally with respect to said machine frame, a grass gathering reel mounted on said swinging frame and having fingers to dig into the loose soil and gather up the quack grass therein, means for adjusting said swinging frame to change its position with respect to the loose soil thrown up by the furrow, and a source of motive power for said reel mounted on said swinging frame.

5. A machine of the class described comprising a frame having carrying wheels, a swinging frame mounted to oscillate on vertical pivots therein, means for adjusting said swinging frame horizontally, a yoke pivotally supported in said swinging frame, a source of motive power mounted on said yoke on one side of its pivot, grass gathering reels carried by said yoke on the other side of its pivot and operatively connected with said source of motive power, one of said reels having fingers adapted to dig into the loose soil and gather up the quack grass therein, and a lever mechanism connected with said yoke for tilting it on its pivots to raise or lower said reels.

6. A machine of the class described comprising a frame having carrying wheels, a swinging frame mounted to oscillate on vertical pivots in said machine frame, a yoke centrally pivoted in said machine frame, a reel mounted in said yoke on one side of its pivot, a source of motive power supported by said yoke on the other side of its pivot and operatively connected with said reel, a second yoke pivoted on said first-named yoke, a second reel mounted therein and operatively connected to said first-named reel, said first-named reel having fingers for digging into the soil and gathering up the quack grass therein, said second reel having fingers for stripping the grass from said first reel, and means for tilting said first-named yoke on its pivots to raise and lower said reels.

7. A machine of the class described comprising upper and lower rails having carrying wheels, a frame having vertical pivots at one end in said upper and lower rails and adapted to oscillate horizontally, and having a support at its other end whereon said frame is adapted to slide in its horizontal movement, mechanism for moving said frame diagonally with respect to the direction of movement of the machine, and grass picking reels mounted in said frame and adapted to dig into the soil and collect the grass roots therein.

8. A machine of the class described comprising a frame and having wheels to travel in the furrow and upon the land, a frame mounted to swing horizontally and diagonally with respect to said machine frame, and means mounted in said swinging frame for digging into the loose soil thrown up and collecting the grass roots therein.

9. A machine of the class described comprising a frame having supporting wheels, a frame mounted to swing horizontally and diagonally with respect to said machine frame and power operated means mounted in said swinging frame for digging into the loose soil thrown up and collecting the grass roots therein.

10. A machine of the class described comprising a frame having supporting wheels, a frame mounted to swing horizontally and diagonally with respect to said machine frame, means for adjusting said swinging frame to the desired angle, and means mounted in said swinging frame for digging into the loose soil and collecting the grass roots therein.

11. A machine of the class described comprising a frame having supporting wheels, a frame mounted to swing horizontally and diagonally with respect to said machine frame, means for adjusting said swinging frame to the desired angle, means mounted in said swinging frame for digging into the loose soil and collecting the grass roots therein, and means for raising and lowering said grass collecting means.

12. A machine of the class described comprising a frame having wheels to travel in the furrow and upon the land, means supported in said frame to swing horizontally and diagonally thereto and having means for digging into the loose soil and collecting the grass roots therein.

13. A machine of the class described comprising a frame having carrying wheels, reels mounted in said frame, at an angle to the direction of movement of the machine and having fingers adapted to dig into the loose soil and gather up the grass roots therein.

14. A machine of the class described comprising a frame having a pair of carrying wheels adapted to run in the furrow and a single wheel to run upon the land, reels mounted in said frame, at an angle to the direction of movement of the machine and having fingers adapted to dig into the loose soil and gather up the grass roots therein, and said reels being mounted for horizontal and vertical adjustment in said frame.

15. A machine of the class described, comprising a wheeled support adapted to travel along a furrow, rotary means carried by said support, said means having spaced fingers located to dig into the loose soil at the side of the furrow to separate grass roots therefrom, means to rotate said rotary means, and means to collect said grass roots.

16. A machine of the class described, comprising a wheeled support adapted to travel along a furrow, rotary means carried by said support, said means having spaced fingers operating transversely to the movement of the support to dig into the loose soil at the side of the furrow to separate grass roots therefrom, means to rotate said rotary means, and means to collect said grass roots.

In witness whereof, I have hereunto set my hand this 12th day of April 1923.

HERMAN E. PEARSON.